United States Patent

Holden

[19]

[11] Patent Number: 6,051,971
[45] Date of Patent: Apr. 18, 2000

[54] SCALE READING APPARATUS WITH A MAGNETIC SENSOR UNIT FOR ADJUSTING RELATIVE PHASE OF THE QUADRATURE PULSES

[75] Inventor: Peter G Holden, Cirencester, United Kingdom

[73] Assignee: Renishaw PLC, Gloucestershire, United Kingdom

[21] Appl. No.: 08/930,181

[22] PCT Filed: Mar. 5, 1997

[86] PCT No.: PCT/GB97/00594

§ 371 Date: Oct. 20, 1997

§ 102(e) Date: Oct. 20, 1997

[87] PCT Pub. No.: WO97/34126

PCT Pub. Date: Sep. 18, 1997

[30] Foreign Application Priority Data

Mar. 13, 1996 [GB] United Kingdom .................. 9605278

[51] Int. Cl.[7] .................. G01R 35/00; G01R 33/025; G01B 7/14; G01D 5/245
[52] U.S. Cl. .................. 324/207.24; 324/207.2; 324/202; 324/207.12; 33/708
[58] Field of Search .................. 324/207.2, 202, 324/207.21, 207.24, 207.12, 207.14, 244.1, 225; 338/32 R, 32 H; 341/13, 15; 250/237 G, 578.1; 33/706, 708

[56] References Cited

U.S. PATENT DOCUMENTS

| 4,074,258 | 2/1978 | Dore et al. .................. 341/13 |
| 4,143,267 | 3/1979 | Johnson et al. .................. 250/231.18 |
| 4,400,890 | 8/1983 | Ohkubo et al. .................. 33/708 |
| 4,421,980 | 12/1983 | Kuhne .................. 250/231.18 |
| 4,492,861 | 1/1985 | Kebschull et al. .................. 250/237 G |
| 4,616,131 | 10/1986 | Burkhardt .................. 250/231.14 |
| 4,829,248 | 5/1989 | Loubier .................. 324/207.2 |
| 5,500,589 | 3/1996 | Sumcad .................. 324/202 |

FOREIGN PATENT DOCUMENTS

| 0115572 | 8/1984 | European Pat. Off. . |
| 0 182 394 | 5/1986 | European Pat. Off. . |
| 25 40 412 | 3/1977 | Germany . |
| 3427 067 A1 | 2/1985 | Germany . |
| 612500 | 7/1979 | Switzerland . |
| 670802 | 6/1979 | U.S.S.R. . |
| 1504691 | 3/1978 | United Kingdom . |
| 86/03833 | 7/1986 | WIPO . |
| 87/07944 | 12/1987 | WIPO . |
| WO 88/02848 | 4/1988 | WIPO . |

Primary Examiner—Jay M. Patidar
Attorney, Agent, or Firm—Oliff & Berridge, PLC

[57] ABSTRACT

An opto-electronic scale reading apparatus includes a scale 10 and a readhead 14 movable one relative to another. The readhead produces a pair of quadrature pulses which enable the generation of an incremental count corresponding to the displacement of the readhead 14 relative to a reference mark 80. The reference mark 80 is a permanent magnet mounted on the scale substrate inside a non-ferromagnetic casing 90. A pair of differential Hall sensors 62A,B within the readhead, and associated processing circuitry generate a step-change ZERO pulse when the readhead 14 and scale 10 are in a particular relative position. This relative position can be adjusted to enable corresponding adjustment of the relative phase of the quadrature pulses emitted from the readhead and the ZERO pulse, by means of a ferromagnetic adjusting screw 92. Movement in the position of the screw 92 relative to the permanent magnet 80 changes the position of highest magnetic flux density in the region of the magnet, thereby altering the position of which the ZERO pulse will be emitted.

7 Claims, 3 Drawing Sheets

SCALE READING APPARATUS WITH A MAGNETIC SENSOR UNIT FOR ADJUSTING RELATIVE PHASE OF THE QUADRATURE PULSES

The present invention relates to a scale reading apparatus of the type including a scale defined by a series of spaced apart lines, and a readhead movable relative to the scale in the direction of spacing of the lines. In one type of such apparatus, the readhead includes a light source which illuminates the scale, and a number of optical components which co-operate with the scale to generate a periodic light pattern. Relative movement of the scale and readhead results in a corresponding movement of the periodic light pattern, creating a cyclic light intensity modulation. The readhead also includes a plurality of photodetecting elements upon which the light intensity modulation is incident, and which emit a plurality of phase-shifted cyclically modulating electrical signals corresponding to the light intensity modulation. These signals are sent to a signal conditioning circuit which combines the signals, and generates therefrom a pair of sinusoidally varying signals having a quadrature relationship; the magnitude and direction of relative movement of the readhead and scale are determined from these quadrature signals.

Devices of this type usually function in an incremental fashion. The quadrature signals output from the signal conditioning circuit serve as a basis for generating a total on a counter, indicative of the relative displacement of the scale and readhead. The total on the counter is either augmented or reduced in correspondence with the number of quadrature signal cycles received, and the order in which these signals arrive at the counter. However, it is also necessary to provide an absolute indication of the relative position of the scale and readhead, for example in order that any error maps associated with the scale may be initialised from the same repeatable location. This is typically provided by a reference mark provided on the scale which causes the readhead to emit a zero pulse when a reference detector in the readhead comes into register with the reference mark. To provide the best stability for the apparatus against thermal drift, for example, the zero pulse from the readhead is preferably emitted at a mid point in the cycle of the quadrature signals. To ensure that this is the case, the relative phase of the quadrature cycle and the zero pulse must be adjustable.

According to the present invention, there is provided an opto-electronic scale reading apparatus including a scale, defined by a series of spaced apart parallel lines, and a readhead movable one relative to another in the direction of spacing of the lines, the readhead including: a light source which illuminates the scale; one or more optical components which co-operate with the scale to generate a periodic light pattern and a cyclically modulating light intensity upon said relative movement; one or more photodetectors and associated electronic processing circuitry for generating a pair of sinusoidally modulating signals having a quadrature relationship from which the magnitude and direction of relative movement may be determined, said apparatus further comprising a reference mark provided on the scale in the form of a ferromagnetic element, and a magnetic sensor in the readhead, wherein said magnetic sensor generates a reference pulse when a predetermined relationship is attained with the ferromagnetic element, and wherein magnetic flux intensity in the region of the magnetic sensor when the readhead lies adjacent the reference mark may be varied by adjustment of the position of a further ferromagnetic element either connected to and movable relative to the first mentioned ferromagnetic element or in the vicinity of said sensor in said readhead, wherein said further ferromagnetic element has a permeability substantially greater than that of free space.

Preferably a magnetic field is generated by a permanent magnet which is provided either in the readhead, or by the ferromagnetic element. A magnetic field source independent of the reference mark and the readhead may however be employed.

An embodiment of the present invention will now be described, by way of example, and with reference to the accompanying drawings in which.

Figure 1:
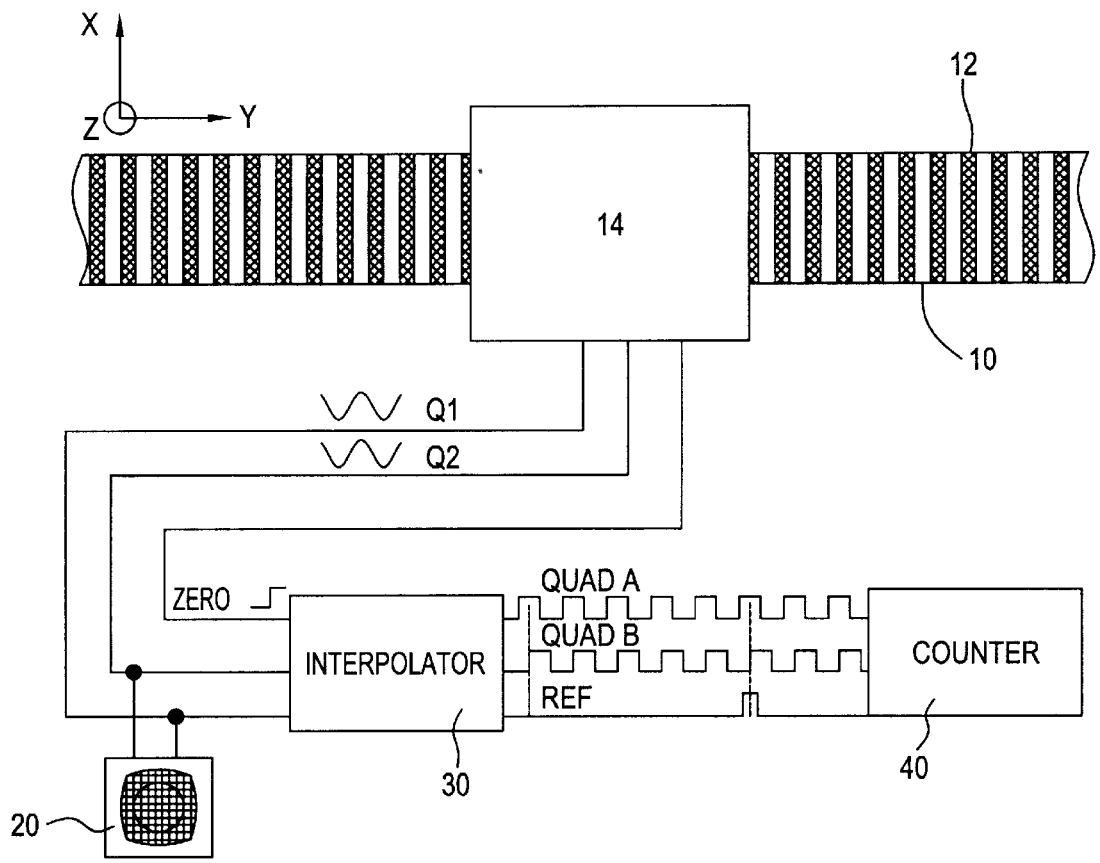
FIG. 1 is a schematic illustration of a scale and readhead apparatus in accordance with the present invention.

Referring now to FIG. 1, a scale 10 comprises a series of alternately spaced light reflective and non-reflective lines 12, extending in the x direction, and spaced apart in the y direction. A readhead 14, mounted in register with the scale and offset therefrom in the z direction, is movable relative to the scale 10 in the y direction. The readhead 14 includes a light source and one or more optical components such as gratings which, in conjunction with light reflected from the scale 10, generate a periodic light pattern in the readhead 14. Relative movement of the scale 10 and readhead 14 results in a corresponding movement of the periodic light pattern, and thereby a cyclically varying light intensity modulation. A plurality of photodetectors in the readhead, positioned in a mutually phase shifted relationship with respect to the periodic light pattern, generate a plurality of electrical signals corresponding to the modulating light intensity. These electrical signals are combined to generate a pair of sinusoidally varying signals Q1,Q2, having a quadrature relationship. Possible optical configurations for the readhead, and the generation of signals Q1,Q2 is known per se from e.g. GB 1,504,691, WO86/03833, WO87/07944.

The quadrature signals Q1,Q2 form the basis of an incremental count corresponding to the displacement of the readhead 14 relative to a reference position on the scale 10. Further, it is possible to resolve the movement of the readhead 14 relative to the scale 10 to within a fraction of a single cycle of the quadrature signals Q1,Q2; the signals Q1,Q2 may be thought of as generating a circular Lissajous figure 20 when viewed one against the other, with rotation about the circle. Sub-cycle resolution may thus be achieved by dividing the circle into an equal number of segments.

The quadrature signals Q1,Q2 are input to an interpolator 30 which effectively performs the function of squarewave rectifying and frequency multiplying the signals Q1 and Q2 by a factor of e.g. 5 to produce two series of squarewave output pulses QUADA,QUADB having a quadrature relationship. The pulses QUADA,QUADB are sent to a counter 40 which generates an incremental total therefrom; the total being augmented in the event that QUADA pulses arrive 90° ahead of QUADB, and reduced in the event that QUADB pulses arrive at 90° before QUADA. Changes in the counter total occur at each rising or falling edge of signals QUADA, QUADB; frequency multiplication by a factor of 5 from the interpolator 30 thus enabling resolution to $\frac{1}{20}$ of a cycle of signals Q1,Q2. Additionally, the interpolator 30 generates, internally, a reference squarewave pulse REF once per cycle of quadrature signals Q1,Q2. The pulse REF is emitted to the counter 40 to zero its output when the interpolator receives a ZERO output from the readhead.

Figure 2:
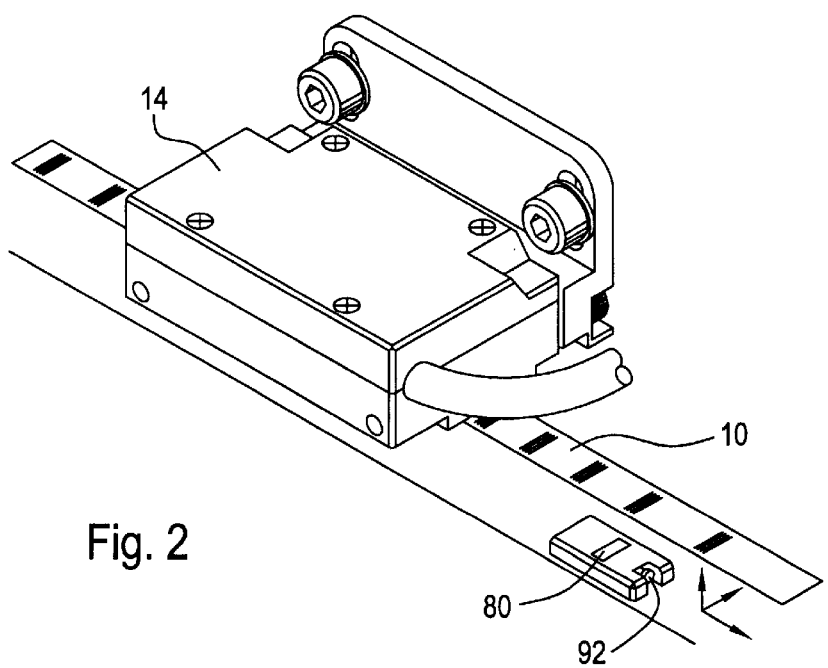
FIG. 2 is a perspective view of the device illustrated in FIG. 1.
Figure 3:
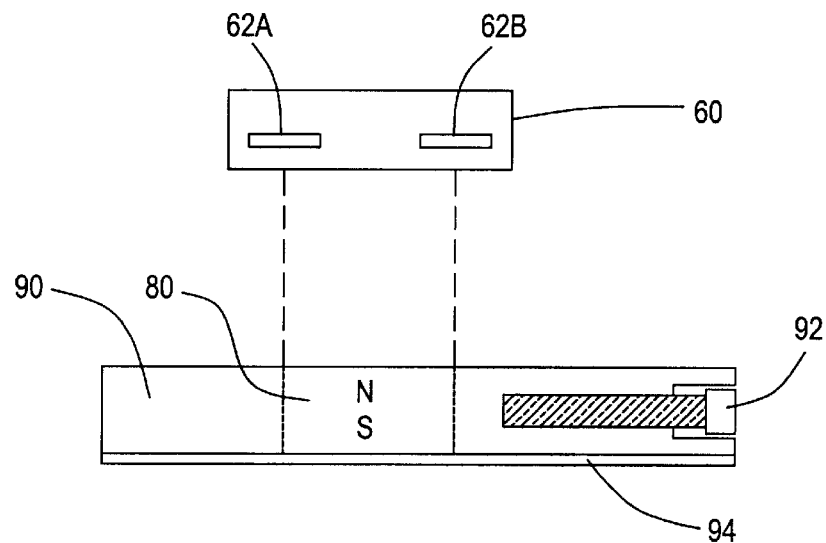
FIG. 3 is a schematic illustration of the reference mark provided in accordance with the present invention.
Figure 4:
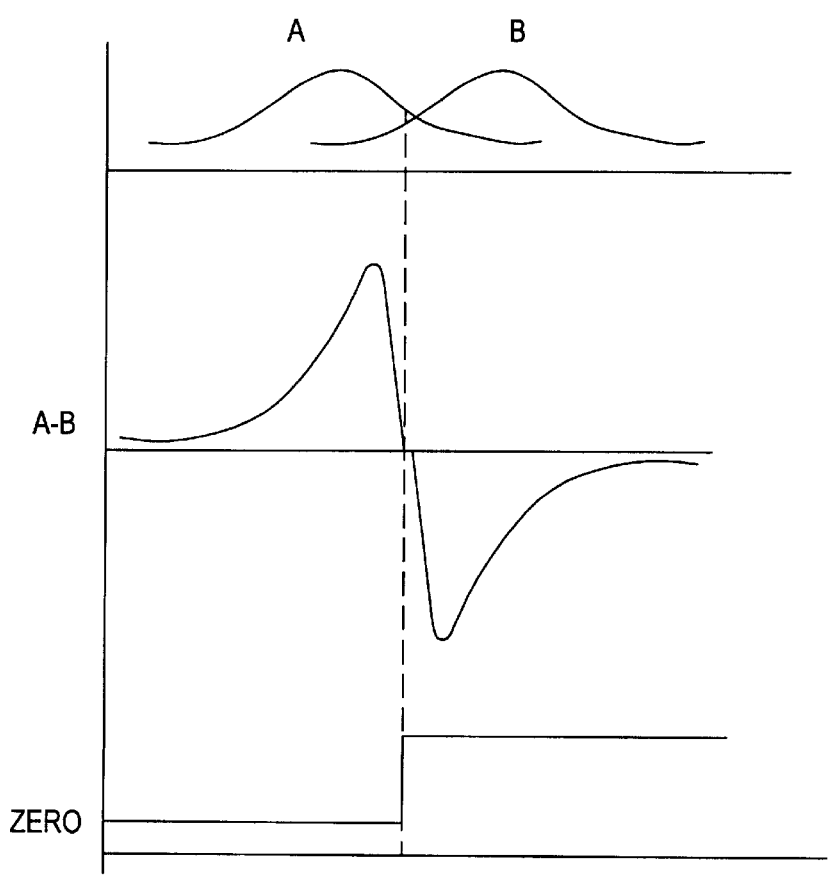
FIG. 4 is a signal diagram illustrating the operation of the reference mark of FIG. 3.

Referring now to FIGS. 2 to 4, a change of state of ZERO output is emitted by a magnetic field sensor 60 and associated processing electronics (not shown) provided in the readhead 14, when the sensor 60 attains a precise position with respect of a reference mark in the form of a permanent magnet 80 provided on the scale for example, on the substrate of the scale adjacent the scale track. To reduce variations in the magnetic field when the reference mark is mounted on a ferromagnetic substrate, permanent magnet 80 and casing 90 are mounted on a steel substrate 94.

The magnetic field sensor 60 includes two individual Hall sensors 62A,B and integrated processing which generates a step output when the differential output A-B of the two Hall sensors passes through zero; the step change being positive for a differential transition in one direction, and negative for a differential transition in the other. In order to adjust the relative phase of the quadrature signals Q1,Q2 (and thus signals QUADA,QUADB, and REF) relative to the ZERO pulse, the flux density generated by permanent magnet 80 is adjusted such that position of maximum flux intensity in the x direction and at a given z stand-off are varied. This is achieved by mounting magnet 80 inside a non-ferromagnetic casing 90 housing a ferromagnetic adjusting element in the form of a screw 92 at one end. The screw may be inserted and retracted from casing 90 thereby to alter the magnetic permeability of the space adjacent the magnet 80, and thus the flux density in the space which lies in register with the magnet. This, in turn, affects the relative position of the reference mark and the readhead at which the differential step output of the Hall sensors is emitted, thus enabling an adjustment of the time/relative phase at which the zero pulse is emitted.

Figure 5:
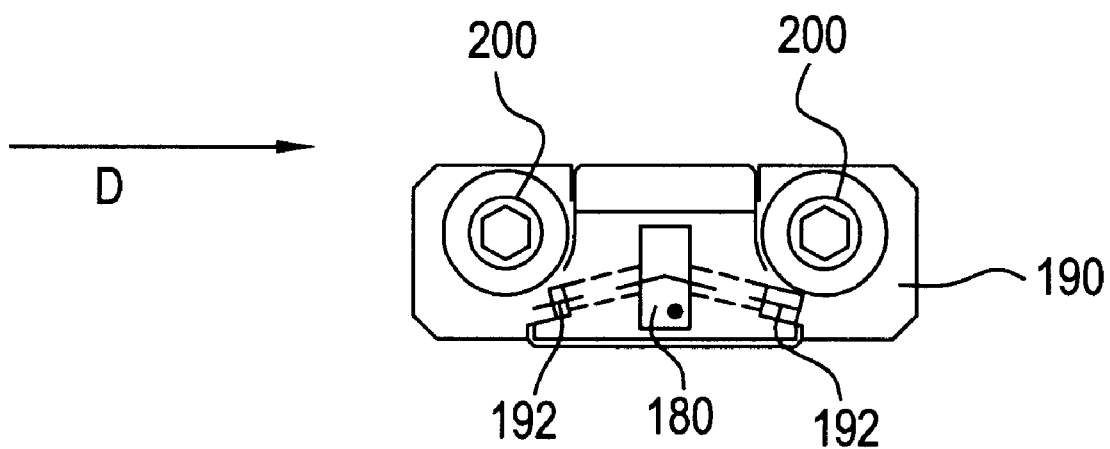
FIG. 5 is an elevation of a modification of the reference mark of FIGS. 2 and 3.

In a modification of the reference mark, illustrated in elevation in FIG. 5, the magnetic flux density in the region adjacent a permanent magnet 180 is adjusted by means of one of two ferromagnetic adjusting bolts 192. The bolts being mounted within a plastic casing 190 and extending at an angle relative to the direction D of relative movement of the scale and readhead, this allowing the space for the retention of mounting bolts 200.

In a further embodiment the reference mark on the scale has the form of an unmagnetised soft iron ferromagnetic element. The readhead contains a permanent magnet (or other source, such as an electromagnet) and a magnetic field sensor. The soft iron element on the scale effectively completes a relatively high permeability magnetic circuit, and as a result, "conducts" flux to the magnetic sensor in the readhead when the soft iron element and readhead pass into register.

In a modification of either embodiment, the phase of the zero pulse may be adjusted by altering the flux density in the vicinity of the field sensor 60 for a given displacement of the readhead by adjusting the position of a ferromagnetic adjusting element (such as a permanent magnet or soft iron element) in the region of the Hall sensor within the readhead 14. In a further modification an alternative magnetic sensor (which is not necessarily a Hall sensor or a differential sensor) may be employed.

The present invention has been described by exemplification with respect to a reflective optical encoder; transmissive optical encoders as well as magnetic, capacitive and other encoders may be employed.

I claim:

1. Scale reading apparatus including a scale defined by a series of spaced-apart lines, and a readhead, the scale and readhead being capable of relative displacement resulting in the generation of cyclically modulating signals, used to create an incremental value representative of the relative displacement of the scale and readhead from a reference position, the apparatus further comprising:

a reference mark on the scale including a ferromagnetic element;

a magnetic sensor in the readhead which generates a reference pulse when the readhead and reference mark are in a particular relative position;

an adjusting element made of ferromagnetic material, which is in the readhead or on the scale, whose position is adjustable to vary the magnetic flux density in the region of the magnetic sensor when the readhead and reference mark are in register, and thus to vary the particular relative position of the scale and readhead at which the reference pulse is generated.

2. Apparatus according to claim 1 wherein the reference mark is a permanent magnet.

3. Apparatus according to claim 1 wherein the readhead includes a magnetic field source, and the ferromagnetic element of the reference mark is provided by an unmagnetised ferromagnetic material.

4. Apparatus according to claim 1 wherein the adjusting element is on the readhead.

5. Apparatus according to claim 1 wherein the adjusting element is on the scale.

6. Apparatus according to claim 1 wherein the scale reading apparatus is opto-electronic.

7. Apparatus according to claim 1 comprising a pair of adjusting elements.

* * * * *